Aug. 25, 1964

J. H. CROW 3,146,436

ARABIC NUMERAL DISPLAY HAVING BINARY CODE CONVERSION MATRIX

Filed Jan. 21, 1959

INVENTOR.
JACK H. CROW

BY Karl Huber
James E. Bryan
Alan C. Rose
ATTORNEYS

United States Patent Office 3,146,436

Patented Aug. 25, 1964

3,146,436

ARABIC NUMERAL DISPLAY HAVING BINARY CODE CONVERSION MATRIX

Jack H. Crow, Sarasota, Fla., assignor to Nuclear Corporation of America, Inc., Denville, N.J., a corporation of Delaware Filed Jan. 21, 1959, Ser. No. 788,140
3 Claims. (Cl. 340—336)

Figure 2:
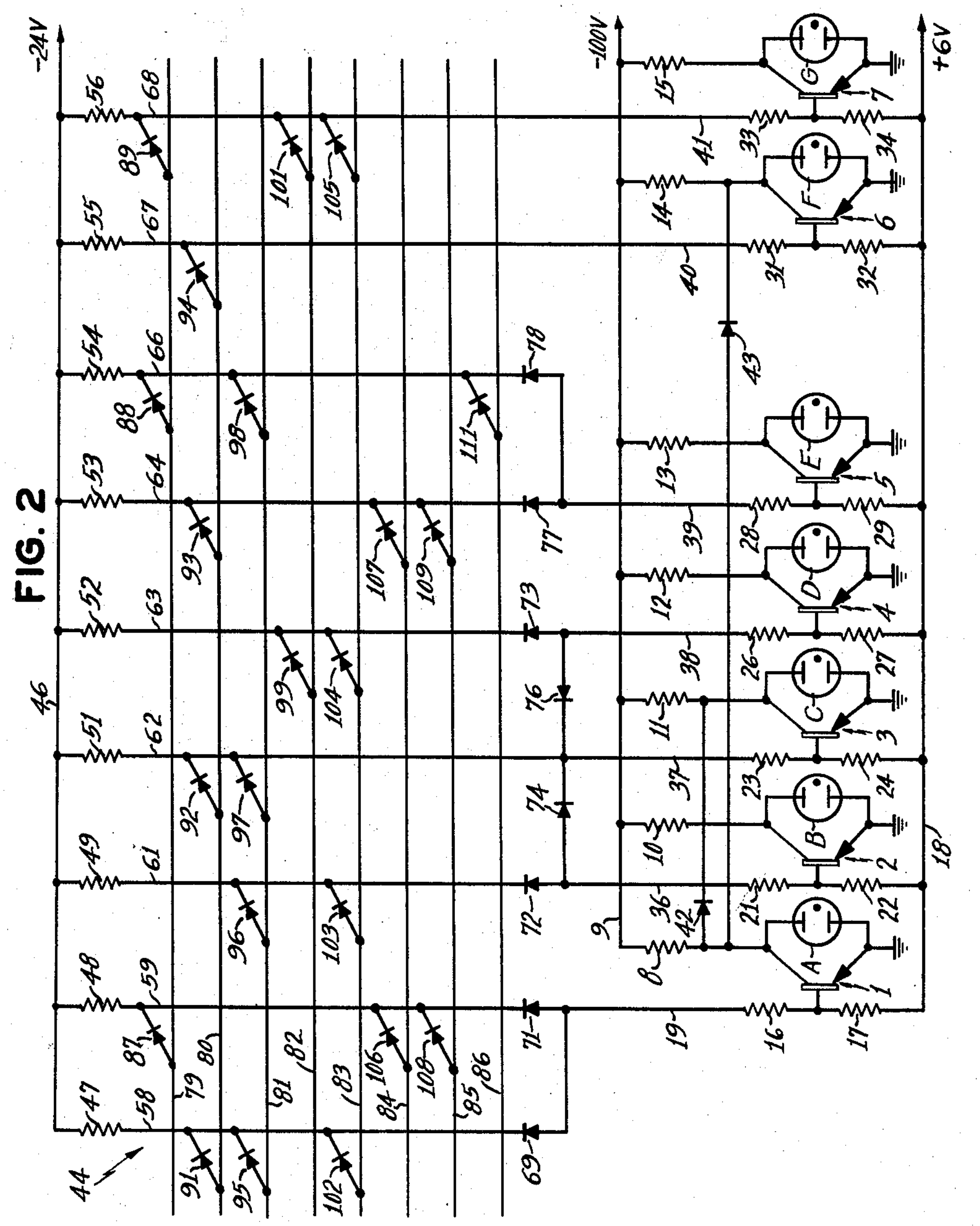

The present invention relates to code converters and more particularly to a code converter for converting a modified cyclic binary code to a pattern of voltages suitable for controlling the various elements of a glow tube array so that the elements reproduce in Arabic numeral form the binary information applied to the conversion circuit.

There are a number of glow tube arrangements available today for displaying Arabic numerals. Although the tubes take many forms, the particular tube with which the present invention is concerned, although not necessarily limited thereto, comprises three independently excitable horizontally elongated elements and four independently excited and vertically elongated vertical elements. The horizontal elements are spaced from one another by a distance approximately equal to the length of each vertical element and a vertical element is disposed between the edges of the horizontal elements, so that the composite of the elements form a figure 8. By selectively energizing various combinations of these elements any numeral from zero through nine may be displayed and as an example by energizing all but the center horizontal element the numeral zero may be formed. Similarly, by energizing only the two vertical elements lying along one edge of the figure 8 arrangement, a numeral one may be displayed, whereas by turning off the upper left hand element and the lower right hand element and energizing all other elements the figure 2 may be displayed.

In accordance with the present invention a modified cyclic binary code is employed as the input information to the apparatus for controlling the glow tubes. A conversion unit is utilized to convert the binary information to a pattern of voltages on separate leads for controlling the various glow tube elements so that the pattern of those elements which glow conforms to the binary number represented by the input information. The specific binary code employed permits the construction of a conversion unit requiring a minimum number of diode and resistive elements to effect the production of the voltage patterns employed for controlling the various glow tube elements. More particularly, the interrelationship of the binary code and the conversion matrix is such as to minimize the complexity of the conversion circuit and to minimize the number of elements and therefore the cost of the circuit.

It is an object of the present invention to provide a binary-to-analog position conversion unit for controlling the illumination of a plurality of glow tube elements so that the selectively illuminated elements produce an Arabic display of a numeral represented by the binary coded input information.

It is another object of the present invention to utilize a relatively small number of diodes and resistors to convert a modified cyclic binary code to a pattern of voltages required to selectively illuminate a pattern of glow tube elements arranged in a figure 8 so that an Arabic numeral representative of the binary input information is produced.

It is yet another object of the present invention to provide a conversion matrix employing interrelated "or" gates and "and" gates for converting a modified cyclic binary code to a voltage position code which controls the illumination of a plurality of glow tube elements such that the selectively illuminated elements produce an Arabic numeral display of the numeral represented by the binary input code.

Figure 1:
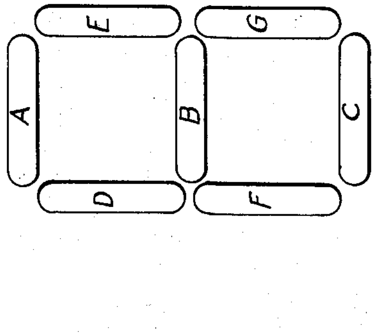

The above and still further objects, features and advantages of the present invention will become apparent upon consideration of the following detailed description of one specific embodiment thereof, especially when taken in conjunction with the accompanying drawings, wherein:

FIGURE 1 of the accompanying drawings is a schematic representation of the arrangement of the various glow tube elements to be controlled by the conversion apparatus of the present invention; and FIGURE 2 is a schematic wiring diagram of the code conversion matrix of the present invention.

Referring specifically to FIGURE 1 of the accompanying drawings, there is illustrated an arrangement of elongated glow tubes A through G which may be selectively energized in order to present any desired numeral 0 through 9. More specifically, there is provided horizontally arranged glow tubes A, B and C having equal spacing therebetween and vertical glow tubes B through G with the tubes D and F disposed vertically one above the other in order to provide a left side to the figure and tubes E and G similarly disposed along the right side of the figure. The figure presented by the glow tubes is a figure 8 and thus when all of the tubes A through G are illuminated a figure 8 is presented by the display. By selectively energizing only predetermined elements of the glow tubes A through G any number pattern 0 through 9 may be displayed. Reference is made to Table I in which the number to be presented is displayed along the left side of the table, letters, each representing glow tubes, are displayed along the top of the table and "x's" are applied at the intersection of the numbers and letters where a tube is turned off. In order to present a numeral 0 all of the tubes are illuminated except the tube B, this being illustrated in the table by an "x" being drawn at the intersection of the 0 numeral row and the B tube column. The tubes A and C through G are energized and therefore present a glowing pattern forming a four-sided rectangle. In order to display the number 1, the segments E and G are turned on and therefore the segments A through D and F are turned off. Reference to the remainder of Table I discloses each of the segments which must be turned off in order to achieve a pattern representative of each of the numbers displayed along the left side of the table.

*Table I*

| | A | B | C | D | E | F | G |
|---|---|---|---|---|---|---|---|
| 0 | ---- | x | ---- | ---- | ---- | ---- | ---- |
| 1 | x | x | x | x | ---- | x | ---- |
| 2 | ---- | ---- | ---- | x | ---- | ---- | x |
| 3 | ---- | ---- | ---- | x | ---- | x | ---- |
| 4 | x | ---- | x | ---- | ---- | x | ---- |
| 5 | ---- | ---- | ---- | ---- | x | x | ---- |
| 6 | ---- | ---- | ---- | ---- | x | ---- | ---- |
| 7 | ---- | x | x | x | ---- | x | ---- |
| 8 | ---- | ---- | ---- | ---- | ---- | ---- | ---- |
| 9 | ---- | ---- | ---- | ---- | ---- | x | ---- |

The circuit for selectively energizing the glow tubes A through G in accordance with a number represented by a binary input code is illustrated in FIGURE 2 of the accompanying drawings. Referring specifically to FIGURE 2, the glow tube A is connected between the collector and emitter electrodes of a grounded common emitter connected PNP transistor 1. Each of the glow tubes B through G is similarly connected between the collector and the grounded emitter electrodes of PNP transistors 2 through 7, respectively. The transistor 1 has its collector electrode connected through a resistor 8 to a negative voltage bus 9 and each of the transistors 2 through 7 have their collector electrodes connected to the bus 9 through resistors 10 through 15, respectively. For purposes of example only, the voltage on the negative bus 9 is taken to be −100 volts. The base electrode of the transistor 1 is connected to the junction of resistors 16 and 17 with the resistor 17 being returned to a positive voltage bus 18 and the resistor 16 being returned to an input information lead 19. Similarly, the base electrodes of the transistors 2 through 7 are connected to the junction of voltage dividers 21–22, 23–24, 26–27, 28–29, 31–32 and 33–34, respectively. Each of the resistors 22, 24, 27, 29, 32 and 34 are returned to positive bus 18 while the resistors 21, 23, 26, 28, 31 and 33 are returned to input information leads 36, 37, 38, 39, 40 and 41, respectively. For purposes of illustration only the positive voltage bus 18 carries a positive voltage of six volts.

The glow tubes A through G as previously indicated are connected between the collector and emitter electrodes of the PNP transistors 1 through 7 and the voltage on the bus 9 is chosen such with respect to ground that when the transistors are non-conductive the voltage across the glow tubes is sufficient to cause a gas discharge and therefore to cause the tubes to glow whereas when the transistors are conducting the voltage drop through the resistors 8 through 15 is such that the voltage maintained across the glow tubes A through G is below the extinction voltage of the tubes and they are extinguished. In consequence, when a glow tube is to be rendered conductive its associated transistor is rendered non-conducting and when the glow tube is to be extinguished, the corresponding transistor is rendered conductive. The circuit of the invention is such that it is necessary to connect a diode 42 between the collector electrodes of the transistors 1 and 3 and a diode 43 between the collector electrode of the transistors 1 and 6. The two diodes 43 and 42 have their anodes connected to the collector electrode of the transistor 1. In consequence of the utilization of the diodes 42 and 43 the glow tubes C and F associated with transistors 3 and 6 are rendered non-conductive regardless of the condition of their associated transistors since when the transistor 1 is rendered conductive its collector voltage becomes less negative with respect to ground than when the transistor is non-conductive and in consequence a relatively heavy current is drawn through the resistors 11 and 14, thereby reducing the collector voltages of the transistors 3 and 6 and dropping the voltage at these electrodes below the extinction voltage of the glow tubes C and F. Therefore, the tubes C and F are rendered non-conductive even though their associated transistors 3 and 6 are non-conductive.

The circuit for controlling the conductivity of the various transistors 1 through 7 constitutes a matrix which applies appropriate control voltage to the leads 19 and 36 through 41. Referring now to the aforesaid matrix which is generally designated by the reference numeral 44 there is provided a negative voltage bus 46 to which is applied a negative voltage with respect to ground of, for example, only −24 volts. The voltage bus 46 is connected through resistors 47, 48, 49, 51, 52, 53, 54, 55, and 56 to vertically extending leads 58, 59, 61, 62, 63, 64, 66, 67, and 68, respectively. The leads 58 and 59 are connected through diodes 69 and 71 respectively, to the lead 19. The leads 62 and 63 are connected through diodes 72 and 73 respectively to leads 36 and 38 while the lead 62 is directly connected to the lead 37. The lead 37 is connected through diode 74 to the lead 36 and through the diode 76 to the lead 38. The leads 64 and 66 are connected through diodes 77 and 78, respectively, to the lead 39 and the leads 67 and 68 are connected directly to the leads 40 and 41, respectively. The diodes 69 and 71 have their anodes connected to the lead 19, the diodes 72 and 74 have their anodes connected to the lead 36, the diodes 73 and 76 have their anodes connected to the lead 38 and the diodes 77 and 78 have their anodes connected to the lead 39. The diode pairs 69–71, 72–74, 73–76, 77–78 each constitutes two input coincidence or "and" gates.

Input information is applied to the system via pairs of leads 79–80, 81–82, 83–84 and 85–86. The leads 79 and 80 are adapted to receive voltages indicative of a first order digit on a binary number; that is, a "1" or a "0." The leads 81–82 receive voltages indicative of a second order digit, while the pairs of leads 83–84 and 85–86 receive information indicative of third and fourth order digits, respectively, of a binary number.

In FIGURE 2 the leads 79 through 86 extend horizontally and therefore cross the leads 58 through 68. However, the horizontal and vertical leads are not electrically interconnected except where a diode is connected between the two sets of leads. More paricularly, the leads 59 and 79 are interconnected by a diode 87 with the cathode of the diode connected to the lead 59. In describing the remainder of the matrix the cathode of the diode mentioned in each connection always has its cathode connected to the first mentioned lead. The leads 66 and 79 are interconnected by the diode 88 and leads 68 and 79 are interconnected by diode 89. Leads 58, 62, 64 and 67 are connected to the lead 80 via diodes 91, 92, 93 and 94, respectively, the leads 58, 61, 62 and 66 are connected to the lead 81 by the diodes 95, 96, 97 and 98, respectively, leads 63 and 68 are connected to leads 82 by diodes 99 and 101, respectively, leads 58, 61, 63 and 68 are connected to lead 83 by diodes 102, 103, 104 and 105, respectively, leads 59 and 64 are connected to lead 84 by diodes 106 and 107, respectively, while leads 59 and 64 are connected to lead 85 by diodes 108 and 109, respectively. The lead 66 is further connected to the lead 86 by a diode 111.

The patterns of voltages which must be applied to the leads 79 through 86 in order to obtain the proper display of elements A through G is illustrated in Table II. The left hand column of the table represents the decimal number to be displayed by the elements A through G, the next vertical column represents the binary number applied to the circuit, while the numbers across the top indicate the input leads to the circuit. The numbers appearing at the intersections of the number rows and lead columns indicate the voltages applied to the leads to represent the binary numbers. It will be noted that the voltage combinations do not follow the conventional binary number as represented in the natural binary code. For instance, the binary 4 is represented by the binary number 0110, as opposed to the more conventional binary representation 0100. The voltages applied to each of the pairs of leads 79–80, 81–82, etc., are either zero or −24, and when a binary zero is to be displayed by the apparatus a zero voltage is applied to the lower lead of each of the pairs of leads 79 through 86, while −24 volts are applied to the upper lead of each of the pairs of aforesaid leads. Several examples of the operation of the circuit will now be presented so that the invention may be more fully understood.

*Table II*

| | | 85 | 86 | 83 | 84 | 81 | 82 | 79 | 80 |
|---|---|---|---|---|---|---|---|---|---|
| 0 | 0000 | −24 | 0 | −24 | 0 | −24 | 0 | −24 | 0 |
| 1 | 0001 | −24 | 0 | −24 | 0 | −24 | 0 | 0 | −24 |
| 2 | 0010 | −24 | 0 | −24 | 0 | 0 | −24 | −24 | 0 |
| 3 | 0011 | −24 | 0 | −24 | 0 | 0 | −24 | 0 | −24 |
| 4 | 0110 | −24 | 0 | 0 | −24 | 0 | −24 | −24 | 0 |
| 5 | 0111 | −24 | 0 | 0 | −24 | 0 | −24 | 0 | −24 |
| 6 | 1100 | 0 | −24 | 0 | −24 | −24 | 0 | −24 | 0 |
| 7 | 1101 | 0 | −24 | 0 | −24 | −24 | 0 | 0 | −24 |
| 8 | 1110 | 0 | −24 | 0 | −24 | 0 | −24 | −24 | 0 |
| 9 | 1111 | 0 | −24 | 0 | −24 | 0 | −24 | 0 | −24 |

In order to display the numeral 0 by means of the elements A through G, all of the elements except the element B must be illuminated. Therefore, all of the transistors 1 through 7 must be rendered non-conductive except the transistor 2, which controls conduction of the element B. When the numeral 0 is to be displayed, the upper leads of each of the pairs of leads 79 through 86 have −24 volts applied thereto and each of the lower leads have zero volts applied thereto. In consequence, the diode 91 which has its cathode connected to lead 58 is rendered conductive since the cathode is returned through resistor 47 to the negative lead bus 46 and the anode is returned to a zero voltage. Conduction of the diode 91 increases the voltage on the lead 58 to approximately the voltage of the anode of this diode and therefore the lead 58 is substantially at zero voltage. Similarly, the diode 106 connected between the leads 59 and 84 is rendered conductive and in consequence the cathodes of both of the diodes 69 and 71 are approximately at zero potential. The voltage drop from the lead 18 to the lead 19 is approximately 6 volts, and the base electrode of the transistor 1 is connected to receive a predetermined portion of this positive voltage which is sufficient to render the transistor 1 non-conductive. In a common emitter connected of PNP type transistor circuit, the base electrode of the transistor must be negative with respect to the emitter electrode in order for the transistor to conduct. However, with zero voltage on the lead 19 the base electrode of the transistor 1 is positive with respect to the grounded emitter electrode and therefore the transistor is non-conductive and the element or glow tube A is illuminated. The diodes 96 and 103, associated with the leads 61 each has its cathode returned to a voltage bus having −24 volts thereon; namely, the buses 81 and 83, and therefore neither of these diodes is conductive. In consequence, there is no current conduction through the resistor 49 connected between the leads 61 and the voltage bus 46 and the lead 61 is maintained at −24 volts. The diode 72, therefore, has −24 volts applied to its cathode and its anode is returned through resistors 21 and 22 to the bus 18 having six volts thereon. Therefore, the diode 72 is rendered highly conductive and the voltage drop through the resistor 22 is sufficient to render the base electrode of the transistor 2 negative with respect to the emitter electrode. The transistor 2 is thereby rendered conductive and the glow tube B is extinguished.

The diode 92 is returned to the lead 80 which has zero volts applied thereto and therefore the lead 62 has a zero potential developed thereon. The zero potential on the lead 62 causes the base electrode of the transistor 3 to be positive with respect to the emitter electrode and therefore the transistor 3 is not conducting and the glow tube C is energized. The condition of lead 62 does not effect the voltage on lead 36 since diodes 72 and 74 form an and-gate, and the voltage on lead 36 can be charged only if both lead 61 and 62 rise in voltage.

The diode 99, connected to lead 63, is returned to the lead 82 and therefore is returned to a source of zero voltage. Consequently, the lead 63 is at zero potential and the diode 73 is substantially non-conductive. The diode 76 is connected between leads 37 and 38, both of which have zero potentials thereon and in consequence the diode 76 is non-conductive. The base electrode of the transistor is positive with respect to the grounded emitter and the transistor 4 is non-conductive rendering the glow tube D conductive. Both of the leads 64 and 66 are at zero potential as a result of the action of the diodes 93 and 111, respectively, and therefore both the diodes 77 and 78 are substantially non-conductive. The base electrode of the transistor 5 is at a higher potential than the emitter electrode and therefore the transistor 5 is non-conductive and the tube E glows. The diodes 94 and 101 are both conductive and maintain the leads 67 and 68 at zero potential and in consequence the transistors 6 and 7 are rendered non-conductive and the glow tubes F and G are rendered conductive. All of the elements A through G are rendered conductive except the element B and the numeral 0 is displayed by the elements which do glow.

The diodes connected to a single lead, such as, 58, 59, 61, etc., operate as diode or-gates and take a specific example such as diodes 91, 95 and 102 which are connected to the vertical lead 58 of the matrix produce a change of state of the voltage on the lead in response to any pattern of zero input voltages to the anodes of the diodes 91, 95 and 102. In the example just given for the numeral 0 only the diode 91 had a zero voltage applied to its anode and yet the lead 58 had its voltage raised from −24 volts to zero volts. It is apparent therefore that the three diodes operate as or-gates.

The groups of diodes 69–71, 72–74, 73–76 and 77–78 each operate as diode and-gates. More specifically, a variation of voltage on only one of the two vertical leads feeding these gates does not produce a change in voltage at the base of its associated transistor. In the preceding example, the vertical lead 61 was maintained at −24 volts while the vertical lead 62 had its voltage raised to zero volts. However, the lead 36 remained at −24 volts and therefore the variation on one input lead to the and-gate, constituting the diodes 72 and 74, did not affect the voltage on the output lead of the gate which constitutes lead 36. On the other hand, the leads 58 and 59 both had their voltages raised to zero volts and the voltage on the lead 19 was raised to zero volts. It is apparent therefore that the matrix of the invention depends upon the interrelationship of or-gates and and-gates to achieve the desired results with the addition only of the diodes 42 and 43 which convert the output pattern of the matrix to that required to achieve illumination of the desired combination of elements A through G.

It will readily be understood that in a system in which my visual display apparatus is driven from a device which normally maintains the input conductors 79 to 86 at zero potential representing the "0's" in the binary code, the associated transistors 1 to 7 are normally non-conductive so that the associated elements A through G are lit. Under these circumstances the groups of diodes 91, 95 and 102; 87, 106 and 108; 96 and 103, and so forth, which connect the input conductors to the control conductors 58 to 69 function as AND circuits in response to input representations of minus 24 volts representing "1's" in the natural binary code. Further, the groups of diodes 69 and 71, 72 and 74, 73 and 76, and 77 and 78 function as logical OR components. Thus, for example, when minus 24 volts is present at conductors 80, 81 and 83, the conductor 58 carries a 1 which, through diode 69, makes the base of transistor 1 negative so that this transistor conducts to extinguish the element A. The operation of my circuit can readily be followed through in this manner.

To further the understanding of the operation of the apparatus an example of operation is chosen which demonstrates the function of diodes 42 and 43 in the apparatus. The example chosen is the formation of the numeral four by means of the elements A through G under control of the apparatus of the invention. The numeral 4 and reference is now made to Table II of the specification is formed by applying the binary voltage pattern 0110 to the input terminals 79 through 86 of the apparatus. The leads 80, 81 and 83 and 86 have zero voltage applied thereto while leads 79, 82, 84 and 85 have −24 volts applied thereto. The diodes 91, 95 and 102 associated with vertical lead 58 are all conducting since their anodes are returned to zero voltage and the lead 58 is therefore at a zero voltage. On the other hand, all of the diodes 87, 106 and 108 associated with the vertical lead 59 have their anodes returned to −24 volts and therefore the lead 59 is at −24 volts as is the lead 19. In consequence, the transistor 1 is rendered conductive and the segment A is rendered non-conductive. The didiodes 96 and 103 associated with lead 91 both have their anodes returned to zero voltage and therefore the lead 61 is at zero voltage. The diodes 92 and 97 associated with lead 62 have their anodes returned to zero voltage and therefore lead 62 is at zero voltage and the leads 36 and 37 are at substantially zero voltage, and the transistors 2 and 3 are non-conductive and the segments B and C are turned on. The diode 104 has its anode returned to zero voltage and the lead 63 is at zero voltage. Since both leads 62 and 63 are at zero voltage, the lead 38 is at zero voltage and the transistor 4 is non-conducting and the segment D is turned on. The diode 93 is returned to zero voltage and the lead 63 is substantially at zero voltage. The diode 98 is also returned to zero voltage and the lead 66 is at substantially zero voltage. Since both the leads 64 and 66 are maintained at zero voltage lead 39 is substantially at the same voltage and the transistor 5 is rendered non-conductive and the element E is turned on. The diode 94 is returned to zero voltage, the leads 67 and 40 are at zero voltage, and the transistor 6 is rendered non-conductive, and the element F is turned on. The diode 105 is returned to zero voltage and therefore leads 66 and 41 are at zero voltage. The transistor 7 is non-conductive and element G is turned on. So far all elements are turned on except the element A and this obviously will not produce the numeral 4. However, since the transistor 1 is conductive the anodes of the diodes 42 and 43 which are connected to the collector electrodes of the transistors 3 and 6 in the C and F positions are returned to zero voltage and the diodes are rendered conductive. The collector electrodes of the transistors 3 and 6 are reduced to the collector electrode voltage of the transistor 1 and insufficient voltage is developed across the glow tubes C and F to maintain them conductive. Therefore, neither of these elements are conductive and the elements A, C and F are turned off; while the elements B, D, E and G are turned on forming the figure 4.

It can be seen from the above that a system is provided for converting binary coded information into an array of voltage information suitable for controlling the seven elements of a composite glow tube so that these elements display in Arabic numerals the information provided to the apparatus in binary form. The number of elements included in the system is quite small and the apparatus relies primarily upon a novel arrangement of interconnected or-gates and and-gates to achieve the requisite conversion. It will be noted that the resistors 47 through 49 and 51 through 56 are common to both the input or-gates and the output and-gates and therefore serve a dual function in the circuit to reduce thereby the number of resistive elements required in the apparatus. The system utilizes a slightly modified cyclic binary code and the only deviation from a true cyclic code is in the change from the number 5 to the number 6 in which it is required to change the code in three locations whereas in all other positions only a single binary position is altered in order to change from one binary number to its next succeeding or preceding number.

It is again noted that the principles of the present invention provide circuits which are particularly economical. One of the arrangements which produce these economies involves the connections from the collector output of the transistor switching component 1, through the diodes 42 and 43 to the illuminable display segments C and F. These connections insure the de-energization of segments C and F whenever segment A is de-energized. As may be observed from a consideration of Table I, the display of digits 1 and 4 bring this circuit into play. Without such a circuit, a larger number of diodes would be required in the control matrix. Another significant feature of the invention involves the use of the control leads 58, 59 and 61 through 68, which are connected to the input leads by diodes poled in one direction to form or-gates, and to the switching transistors 1 through 7 by diodes poled in the opposite direction to form and-gates. This grouping on the control leads of binary functions which are common to several output switching circuits produces significant economies in the translational operations which are performed. It is further noted that other binary coded decimal input signals, such as the so-called "one-hot" type of input signal could be used, in addition to that set forth in Table II. In such cases, the techniques and circuits mentioned above in this paragraph would still produce economies, but perhaps not to the same extent in all cases.

It is to be understood that the above described arrangements are illustrative of the application of the principles of the invention. Numerous other arrangements may be devised by those skilled in the art without departing from the spirit and scope of the invention.

What I claim is:

1. A display system for producing a representation of Arabic numerals from zero to nine in response to binary coded representations thereof in the form of bits and complements including in combination a plurality of illuminable elements, means mounting said elements to form as a composite unit a configuration of the Arabic numeral eight, a translation matrix having a plurality of input terminals arranged in pairs to be responsive to a binary coded input, a binary bit being applied to one terminal of each pair and the complement of said bit being applied to the other terminal of the pair, a plurality of output terminals connected to said input terminals in a predetermined pattern corresponding to said paired arrangement of input terminals, switching means for each of said elements, and means comprising said switching means for connecting said elements to said output terminals in a predetermined pattern whereby upon the energization of said pairs of input terminals in accordance with a binary number signal representation said switching means are operated to cause energization of said illuminable elements in a pattern corresponding to the Arabic numeral display of said binary number.

2. A display system for producing a representation of Arabic numerals from zero to nine in response to binary coded representations thereof in the form of bits and complements including in combination a plurality of illuminable elements, means mounting said elements to form as a composite unit a configuration of the Arabic numeral eight, a translation matrix having a plurality of input terminals arranged in pairs to be responsive to a binary coded input, a binary bit being applied to one terminal of each pair and the complement of said bit being applied to the other terminal of the pair, a plurality of output terminals connected to said input terminals in a predetermined pattern corresponding to said paired arrangement of input terminals, switching means for each of said elements, means for normally illuminating said elements and means comprising said switching means for connecting said elements to said output terminals in a predetermined pattern whereby upon energization of said pairs of input terminals in accordance with a binary number signal representation said switching means are operated to extinguish those illuminable elements other than the elements having a pattern corresponding to the arabic numeral display of said binary number.

3. A display system for producing a representation of Arabic numerals from zero to nine in response to binary coded representations thereof in the form of bits and complements including in combination a plurality of illuminable elements, means mounting said elements to form as a composite unit a configuration of the Arabic numeral eight, a translation matrix having a plurality of input terminals arranged in pairs to be responsive to a binary coded input, a binary bit being applied to one terminal of each pair and the complement of said bit being applied to the other terminal of the pair, a plurality of output terminals connected to said input terminals in a predetermined pattern corresponding to said paired arrangement of input terminals, respective normally conductive switching means connected in parallel with said illuminable elements, means for applying a potential to said switch and illuminable elements whereby said element is normally extinguished when the corresponding switching means conducts and said illuminable element is illuminated when said switching means is nonconductive and means connecting said switching means to said output terminals in a predetermined pattern whereby upon the energization of said pairs of input terminals in accordance with a binary number signal representation said switching means are rendered nonconductive in a pattern to cause energization of said illuminable elements in a pattern corresponding to the Arabic numeral display of said binary number.

References Cited in the file of this patent

UNITED STATES PATENTS

| | | |
|---|---|---|
| 2,307,173 | Vian | Jan. 5, 1943 |
| 2,590,950 | Eckert et al. | Apr. 1, 1952 |
| 2,644,897 | Lo | July 7, 1953 |
| 2,693,593 | Crosman | Nov. 2, 1954 |
| 2,855,585 | Quinby | Oct. 7, 1958 |
| 2,918,608 | Reith | Dec. 22, 1959 |
| 2,922,993 | Sack | Jan. 26, 1960 |
| 2,953,776 | Blutman | Sept. 20, 1960 |

FOREIGN PATENTS

| | | |
|---|---|---|
| 165,275 | Great Britain | June 30, 1921 |
| 714,180 | Germany | Nov. 22, 1941 |